(12) United States Patent
Ohkita et al.

(10) Patent No.: US 6,233,113 B1
(45) Date of Patent: May 15, 2001

(54) MAGNETIC RECORDING/REGENERATING APPARATUS

(75) Inventors: Masao Ohkita; Mikio Oka; Katsunari Sonoda, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/243,896

(22) Filed: Feb. 3, 1999

(30) Foreign Application Priority Data

Feb. 5, 1998 (JP) .................................................. 10-024372

(51) Int. Cl.⁷ ................................................. G11B 15/675
(52) U.S. Cl. ............................................................ 360/96.5
(58) Field of Search ................................... 360/96.5, 96.6

(56) References Cited

U.S. PATENT DOCUMENTS

| 5,371,639 | 12/1994 | Bryer . |
| 5,377,061 | * 12/1994 | Yoshimura et al. ................ 360/96.5 |
| 5,440,435 | 8/1995 | Busengdal et al. . |

* cited by examiner

*Primary Examiner*—Robert S. Tupper
(74) *Attorney, Agent, or Firm*—Brinks Hofer Gilson & Lione

(57) ABSTRACT

In the magnetic recording/regenerating apparatus of the present invention, the linking member R expands, contracts and rotates under the effect of the elastic member 9d by causing sliding with a slight force by pressing the pressing section of the first member of the second sliding member S. The rotation permits discharge of the loaded cartridge and easy ejection of the cartridge with a slight force.

3 Claims, 16 Drawing Sheets

MAGNETIC RECORDING/REGENERATING APPARATUS

BACKGROUND OF THE INVENTION

1. Field of the Invention

The present invention relates to a magnetic recording/regenerating apparatus. More particularly, the present invention relates to a mounting mechanism for ensuring mounting of a cartridge for housing a magnetic tape.

2. Description of the Related Art

A conventional magnetic recording/regenerating apparatus will be described with reference to a plan view shown in FIG. 19, a sectional view of FIG. 19 cut along the line 20A—20A shown in FIG. 20A, and a partial side view of FIG. 20A shown in FIG. 20B.

In the conventional magnetic recording/regenerating apparatus 21 (hereinafter referred to as the "apparatus 21"), a pair of rail-shaped guiding members 21b and 21c each having a t-shaped groove are attached in a vertically opposite relationship toward the right side end in FIG. 19 to a base plate 21a provided on the bottom.

As shown in FIG. 20A, a pair of openings 21d are formed in a part of the base plate 21a corresponding to a position where the pair of guiding members 21b and 21c are located.

An insertion port 21e for inserting a cartridge 23 into the magnetic recording/regenerating apparatus by guiding a bottom plate 23c of the cartridge described later is formed at the right end of the magnetic recording/regenerating apparatus shown in FIG. 20A.

A pair of leaf springs 22 having a large elastic force with an end screw-fitted and the other end left free are arranged on the back where the guiding members 21b and 21c of the base plate 21a are located. An engagement section 22a is formed by folding at the tip of the free end of each of the leaf springs 22, and an engaging roller 22b is rotatably supported by the engagement section 22a.

The stopper roller 22b is positioned in an opening 21d of the base plate 21a and is movable vertically with one of the screw-fitting sections as a fulcrum within the opening 21d.

A cartridge 3 represented by a two-point chain line in FIG. 2 is inserted through the insertion port 21e, guided by the guiding members 21a and 21b, and mounted within the apparatus 21. In this cartridge 23, a magnetic tape 23a is housed, and a pair of U-shaped guide grooves 23b are formed on the both outer sides as shown in FIG. 20B. The pair of guide grooves 23b are guided by the aforementioned rail-shaped guiding members 21b and 21e to guide the cartridge 23 into the apparatus 21.

A notch 23d is formed at a part of a base plate 23c composing the guide grooves 23b of the cartridge 23. A rotatable pinch roller 23f transferring the magnetic tape 23a to the right and to the left via a tape feeding belt 23g is provided in the cartridge 23 in the cartridge 23.

A magnetic head 24 and a transfer roller 25 are arranged in the apparatus 21.

The loading operation for loading the above-mentioned cartridge 23 onto the apparatus 21 comprises first a step of manually inserting the leading end of the cartridge 23 through the insertion port 21e of the apparatus 21 in the arrow D direction.

The leading end of the bottom plate 23c of the cartridge 23 hits the stopper roller 23b of the leaf spring 22.

When the cartridge 23 in this state is pushed into the apparatus by a stronger force, the base plate 23c of the cartridge 23 presses down the stopper roller 22b. As a result, the leaf spring 22 is deflected downward, and the stopper roller 22b comes into elastic contact with the lower side of the bottom plate 23c.

When the cartridge 23 is further into the interior of the apparatus 21, the roller 22b having been pushed down to the lower side of the base plate 23 is positioned at the notch 23d of the cartridge 23, and goes up under the effect of a large elastic force of the leaf spring 22 to the notch 23d. Then, as shown in FIG. 20A, the stopper roller 22b comes into elastic contact with an end of the notch 23d. The stopper roller 22b presses the end of the notch 23d diagonally upward in the arrow C direction. The cartridge 23 comes into contact with a stopper (not shown) in the apparatus 21 to step there, and is loaded in the apparatus 21.

At this point, the pinch roller 23f of the cartridge 23 is in pressure-contact with a transfer roller 25 in the apparatus 21 so as not to allow further incoming of the cartridge 23 into the apparatus 21.

When the transfer roller 25 rotates in the pressure-contact state of the pinch roller 23f and the transfer roller 25, the pinch roller 23f is rotated so as to permit transfer of the magnetic tape 23a to the right or to the left via the tape feeding belt 23g in the cartridge.

When the cartridge 23 is loaded in the apparatus 21, it is possible to record or regenerate prescribed information onto the magnetic tape 23a by means of the magnetic head 24 through rotation of the transfer roller 25 in response to an instruction from an external computer (not shown) or the like.

The ejecting operation of the cartridge 23 from the apparatus 21 comprises manually and strongly pulling the rear end 23e of the cartridge 23 projecting outside the apparatus 21 as shown in FIG. 19 in the arrow E direction. The stopper roller 22b escapes downward from the notch 23d of the cartridge 23, thereby permitting removal of the cartridge 23 from the apparatus 21.

In the conventional apparatus 21 as described above, however, in which engagement and disengagement of the cartridge 23 have been carried out manually, a considerable force (about 1.5 to 3 kgf) has been required for loading and unloading because of the large elastic force of the leaf spring 22, and it has been a hard work for a powerless person to carry out loading/unloading operation of the cartridge 23.

Particularly when removing the cartridge 23 loaded in the apparatus 21, it was necessary to remove by strongly clamping the rear end of the cartridge 23. A larger force was therefore required for the ejecting operation for discharge than for the loading operation of the cartridge.

SUMMARY OF THE INVENTION

The magnetic recording/regenerating apparatus of the present invention as first means for solving the aforementioned problems comprises a cartridge containing therein a magnetic tape, a first sliding member causing the cartridge to slide for loading, a second sliding member comprising a first member and a second member causing the first sliding member to slide, an enclosure slidably holding individually the first and the second sliding members, and a linking member connecting the first and the second members, wherein the portion between an end and the other end of the linking member is rotatably supported by the enclosure; a pressing section is provided on a part of the first member; the linking member is reversed with the supporting point as a fulcrum when the first member is caused to slide by pressing the pressing section of the first member to cause the first sliding member to slide via the linking member for discharging the cartridge.

In the magnetic recording/regenerating apparatus of the invention as second means for solving the above-mentioned problems, the linking member comprises a first and a second linking members; the first and the second linking members are expandably combined by imparting an elastic force in the longitudinal direction; a junction is formed for each of the first and the second linking members; the junction of the first linking member is engaged with an engagement section of the first sliding members; the junction of the second linking member is detachably engaged with an engagement section between the first member and the second member; when pressing the pressing section of the first member, the portion between the first and the second linking members expands or contracts; engagement of the junction of the second linking member in engagement with the engagement section between the first member and the second member is disengaged; and the linking member is reversed in linkage with sliding of the first member, thereby discharging the cartridge.

In the magnetic recording/regenerating apparatus of the invention as third means for solving the above problems, the second sliding member has a configuration in which the first member and the second member are detachably engaged with each other at the engagement section so as to make the first member rotatable relative to the second member; the pressing section of the front portion of the first member is formed with a prescribed inclination angle to the sliding direction of the first member; a junction is provided at each of one end and the other end of the linking member; the junction at that one end is engaged with the engagement section of the first sliding member; the junction at the other end is engaged with the engagement section of the second sliding member; when pressing the inclined pressing section of the first member, the first member rotates along the inclination of the pressing section, and the first member and the second member are disengaged from each other; the first member slides; and in linkage with sliding of the first member, the linking member is reversed, thereby discharging the cartridge.

DESCRIPTION OF THE PREFERRED EMBODIMENTS

Figure 1:
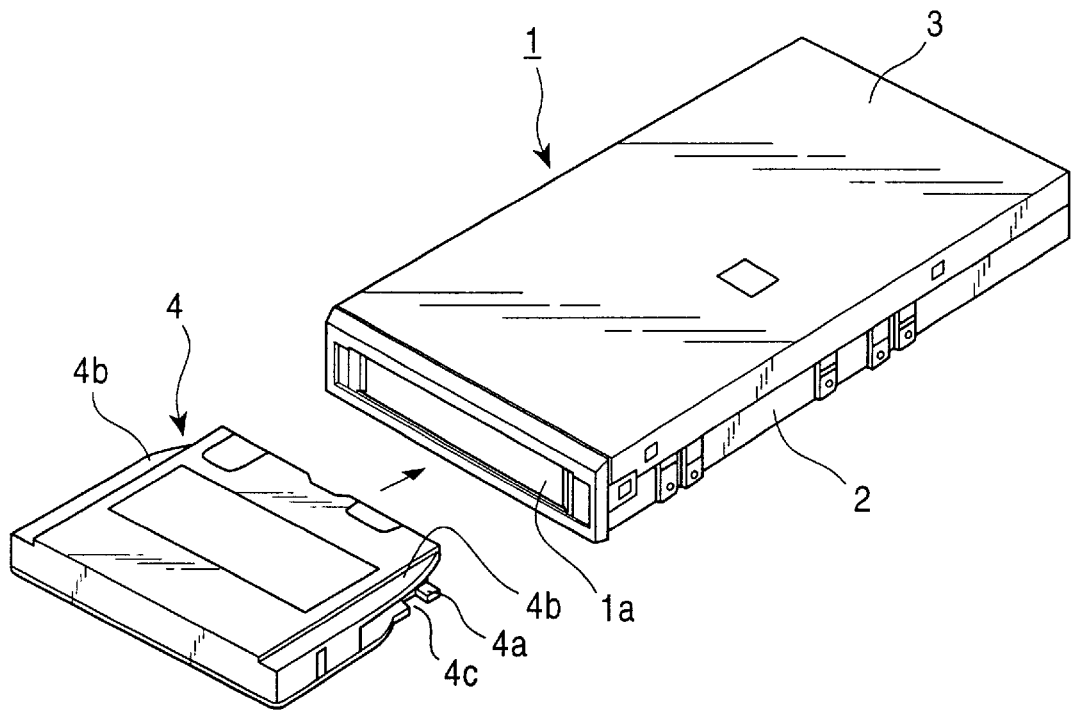
FIG. 1 is a schematic perspective view of the magnetic recording/regenerating apparatus and the cartridge of the present invention.

An embodiment of the magnetic recording/regenerating apparatus of the present invention will be described with reference to FIGS. 1 to 20. The magnetic recording/regenerating apparatus of the invention (hereinafter referred to as the "apparatus 1") has a schematic configuration, as shown in the perspective view of FIGS. 1 and 2, comprising an enclosure 2 attached therein with carious parts described later and having a substantially rectangular outer shape, a cover 3 covering the top of the enclosure 2, and an cartridge insertion port 1a formed on the front of the enclosure 2.

The cartridge 4 loaded onto the apparatus 1 has a magnetic tape housed therein, guiding sections 4a and 4b which guide the cartridge 4 into the apparatus 1, formed in a up/down relationship on the both outer sides, and an engagement section 4c notched in the lower guiding section 4a.

Figure 2:
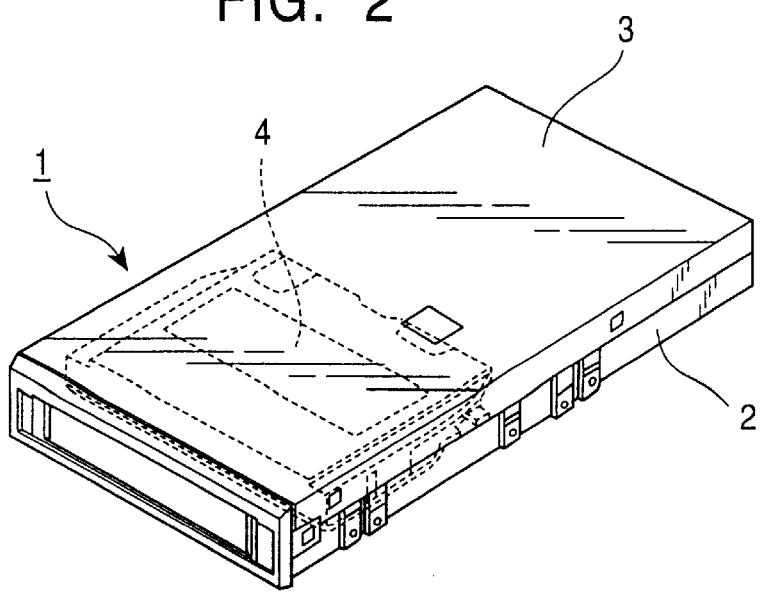
FIG. 2 is a schematic perspective view of the magnetic recording/regenerating apparatus of the invention in which the cartridge.

FIG. 2 is an exterior view of the cartridge loaded onto the apparatus 1: the entire cartridge is inserted into the apparatus.

Figure 3:
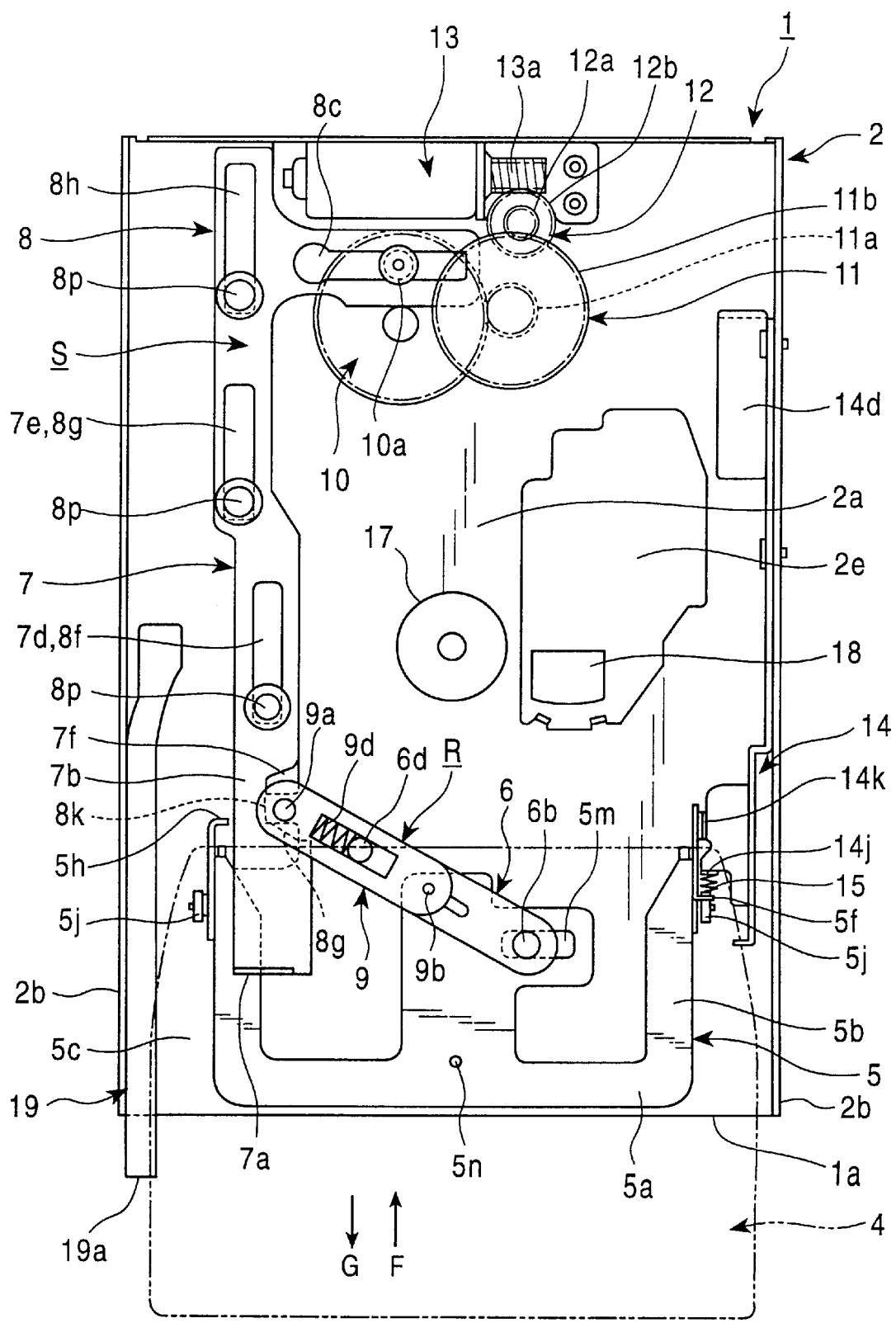
FIG. 3 is a schematic plan view illustrating the interior of an enclosure of the magnetic recording/regenerating apparatus of the invention.

The configuration of the aforementioned apparatus 1 will be described with reference to FIGS. 3 to 20. FIG. 3 is a schematic plan view of the interior of the enclosure 2 of the apparatus 1 as viewed from above after removing the cover 3.

The enclosure 2 housing a plurality of different parts is arranged in the apparatus 1 of the invention. This enclosure 2 is formed into a rectangular exterior shape by press fabrication including stamping and folding of a metal sheet or the like as shown in the plan view of FIG. 4 and the front view of FIG. 5.

The enclosure 2 has a substantially flat bottom plate 2a formed on the bottom. A pair of opposed side plates 2b and 2b are formed by upward bending on the right and the left sides of the bottom plate 2a in the drawing.

Figure 4:
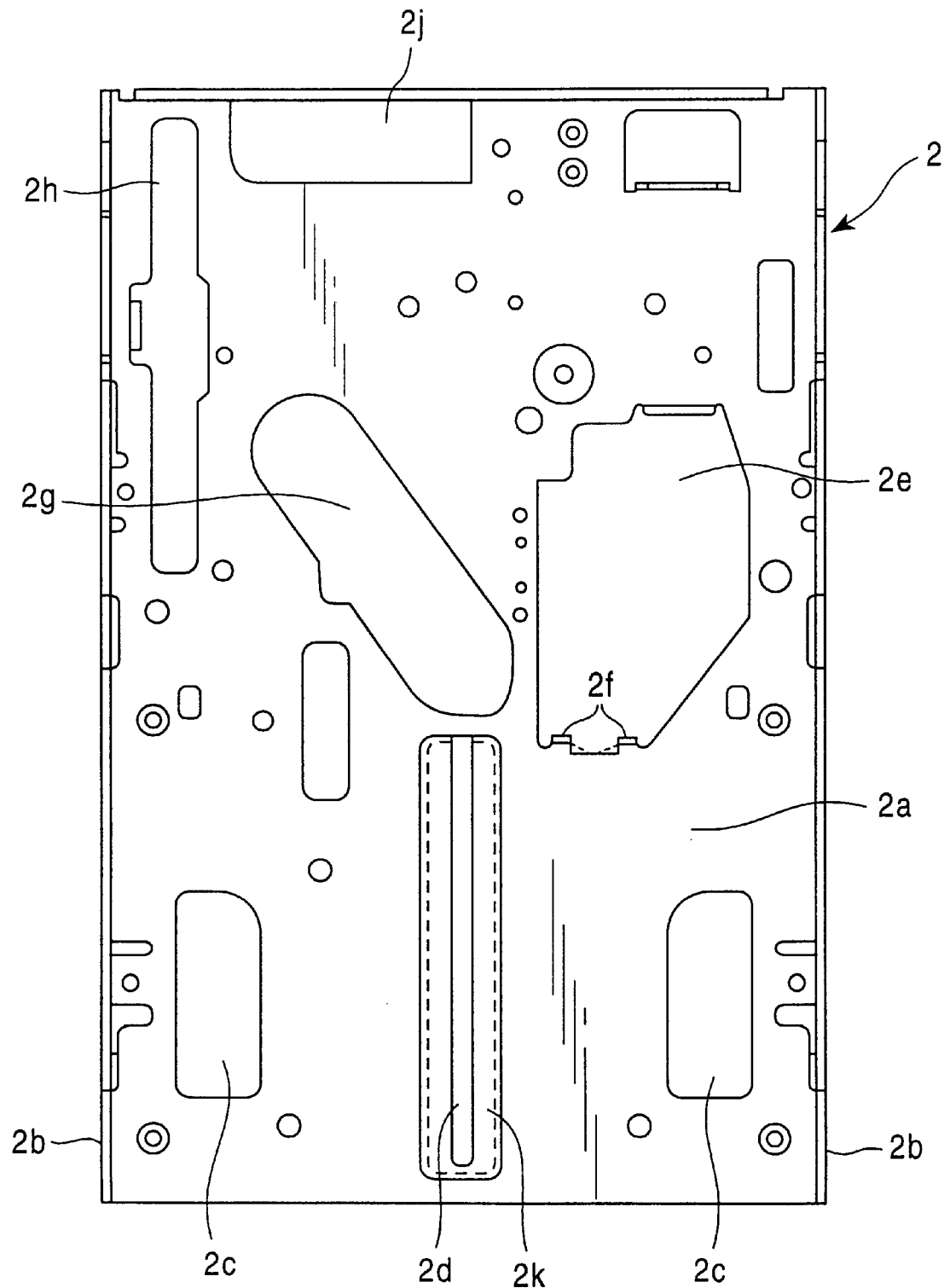
FIG. 4 is a plan view of the enclosure of the magnetic recording/regenerating apparatus of the invention.
Figure 5:
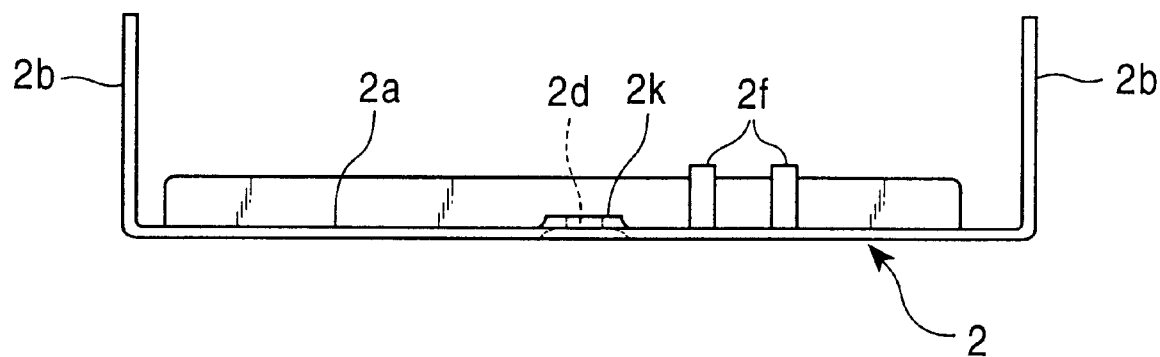
FIG. 5 is a front view of the enclosure of the magnetic recording/regenerating apparatus of the invention.

A pair of the substantially rectangular windows 2c and 2c are formed by stamping at two positions on the right and left of the bottom plate 2a shown at the bottom in FIG. 4. A longitudinally long hole 2d shown in FIG. 4 is formed by stamping substantially at the middle between the pair of windows 2c and 2c.

A protrusion 2k is formed, projecting from the back of the bottom plate 2a, around this long hole 2d.

A substantially rectangular head attachment hole 2e is formed by stamping to the right above the long hole 2d, and two stoppers 2f are formed by notching upward on the inner surface of the head attachment hole 2e toward the bottom of FIG. 4.

A driving belt is stretched around a transfer roller 17 described later and a driving source not shown from the top diagonally to the left above of the long hole 2d in FIG. 4, and an escape hole 2g for the driving belt is formed in substantially an oval shape. A longitudinally long opening 2h is formed by stamping near a side plate 2b to the left of the escape hole 2g in the drawing.

A substantially rectangular motor attachment hole 2j for attachment of the driving source 13 which causes the cartridge 4 to side for loading/unloading is formed toward the left of the top end of FIG. 4, and a plurality of small-diameter round holes are formed by stamping around the proximity to the motor attachment hole 2j.

Figure 6:
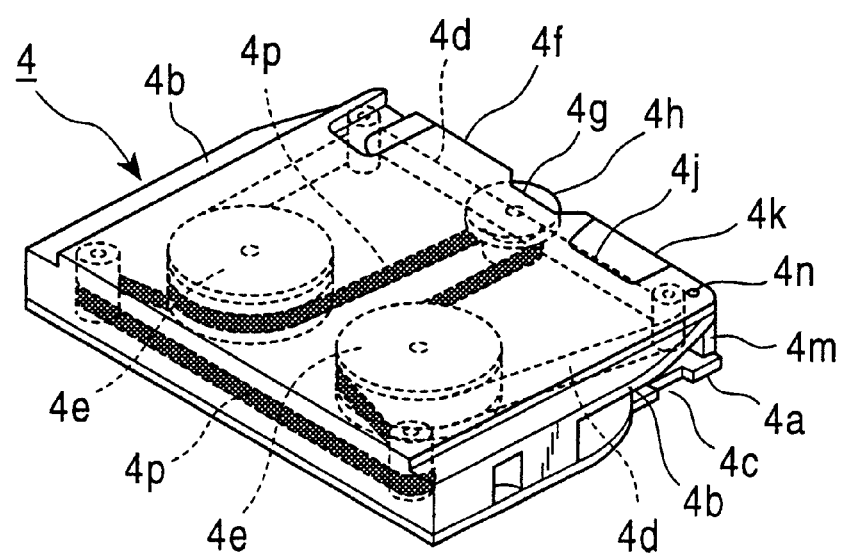
FIG. 6 is a perspective view of a cartridge used in the magnetic recording/regenerating apparatus of the invention.

The cartridge 4 loaded onto the apparatus 1 into a box-like exterior shape, and as shown in FIG. 6, two guiding sections 4a and 4b are formed so as to project outside in a rail shape at the top and the bottom, respectively, of the right and left sides. A notched engagement section 4c is formed on the lower guiding section 4a.

A magnetic tape 4d is housed in the cartridge 4, and the both ends of the magnetic tape 4d are wound on rotatable reels 4e and 4e, respectively.

A notch 4g is formed at the center portion of the front side 4f of the cartridge 4. A part of the periphery is exposed from this notch 4g, and a rotatable pinch roller 4h is arranged. In linkage with rotation of the pinch roller 4h, the reels 4e and 4e rotate clockwise or anticlockwise via a tape feed belt 4p so as to permit winding or unwinding of the magnetic tape 4d onto or from the reels 4e and 4e.

To the right of the notch 4g of the cartridge 4, an opening 4j for exposing the magnetic tape 4d to the front side 4f and causing the magnetic tape 4d to slide to the magnetic head 18 described later is formed, and a cover 4k capable of being opened and closed is provided on the opening 4j.

An end portion 4m is formed on the cover 4k on the right side in the drawing. This end portion 4m is supported by a supporting pin 4n to make the cover 4j rotatable.

A twist coil spring (not shown) is wound around the supporting pin 4n so that, when the cartridge 4 is not loaded onto the apparatus 1, the cover 4k always closes the opening 4j so as to prevent ingression of dust or waste into the cartridge 4.

A first sliding member 5 for stopping the cartridge 4 when the cartridge 4 is inserted into the enclosure as shown in FIG. 3, and causing the cartridge to slide in the arrow F direction for loading onto the apparatus 1 is arranged on the case plate 2a of the enclosure 2.

Figure 7:
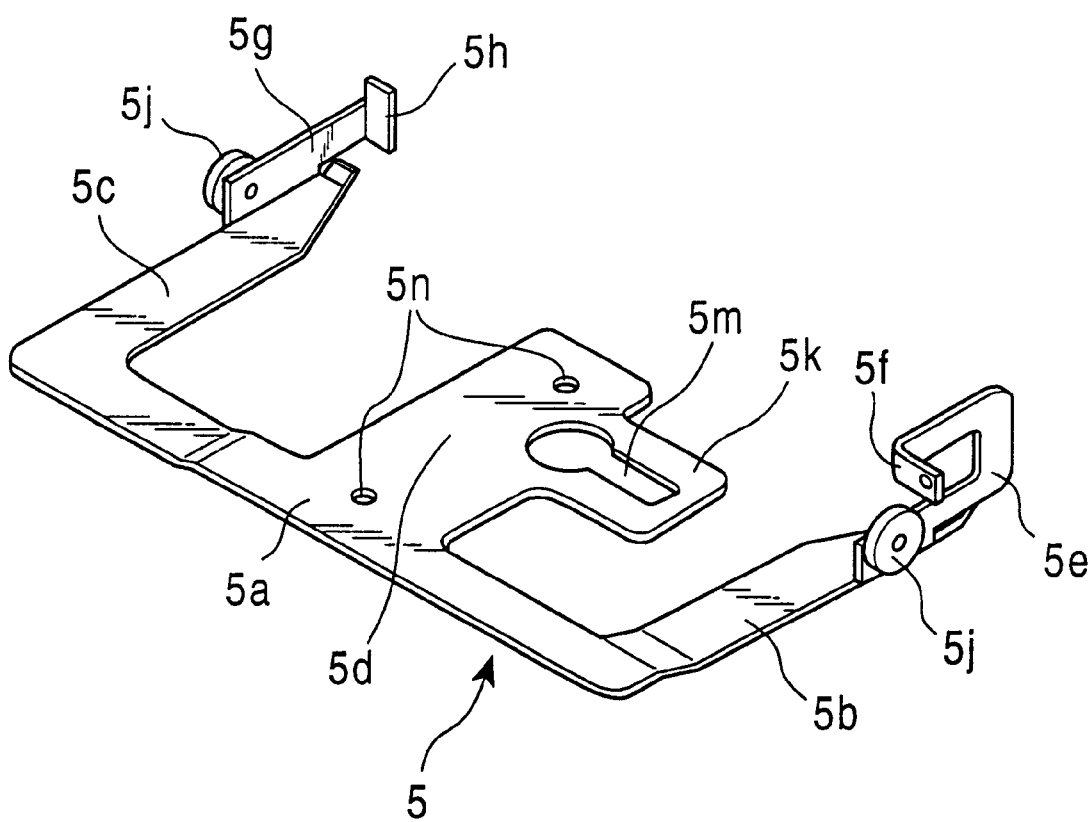
FIG. 7 is a perspective view of a first sliding member of the magnetic recording/regenerating apparatus of the invention.

The first sliding member 5 comprises a metal plate such as a stainless steel plate having a spring function, as a base 5a provided on this side in the drawing, arms 5b and 5c arranged on the right and left sides of the base 5a and a flat link support 5d at the center as shown in the perspective view of FIG. 7, and presents a substantially E-shaped exterior configuration.

A substantially U-shaped roller holder 5e is folded upward toward the leading end of the arm 5b to the right in FIG. 7. The end on this side above the roller holder 5e is folded outward at right angles to form an opening/closing section 5f. When the cartridge 4 is inserted into the apparatus 1, the opening/closing section 4f is brought into contact with an end 4m of the cover 4k of the cartridge 4, thus causing the cover 4k to open forward though rotation of the cover 4k.

Another roller holder 5g folded upward is provided toward the leading end of the arm 5c of the base 5a to the left in the drawing. The roller holder 5g is opposed to the roller holder 5e on the right side.

The leading end of the roller holder 5g is folded inward by right angles to form a stopper 5h. The stopper 5h comes into contact with the front side 4f of the cartridge 4 upon manually loading the cartridge 4 onto the first sliding member 5 so as to prevent the cartridge 4 from being pushed into beyond the stopper 5h.

A pair of stoppers 5j and 5j comprising stopper rollers are rotatably supported at opposite positions on the outside of the roller holders 5e and 5g.

A protrusion 5k projecting in the direction of the arm 5d the right in the drawing is formed toward the leading end of the link support 5d. A long-hole-shaped engagement section 5m is formed by stamping in the protrusion 5k in the arrow F direction, or in a direction perpendicular to the sliding direction in the arrow G direction.

Two attachment holes 5n for slidably attaching the first sliding member 5 to the long hole 2d of the enclosure 2 is formed in the link support 5d.

The first sliding member 5 as described above is slidably provided on the bottom plate 2a of the enclosure 2 to permit sliding of the aforementioned stoppers 5j and 5j on the windows 2c and 2c and on the bottom plate 2a.

Figure 8A:
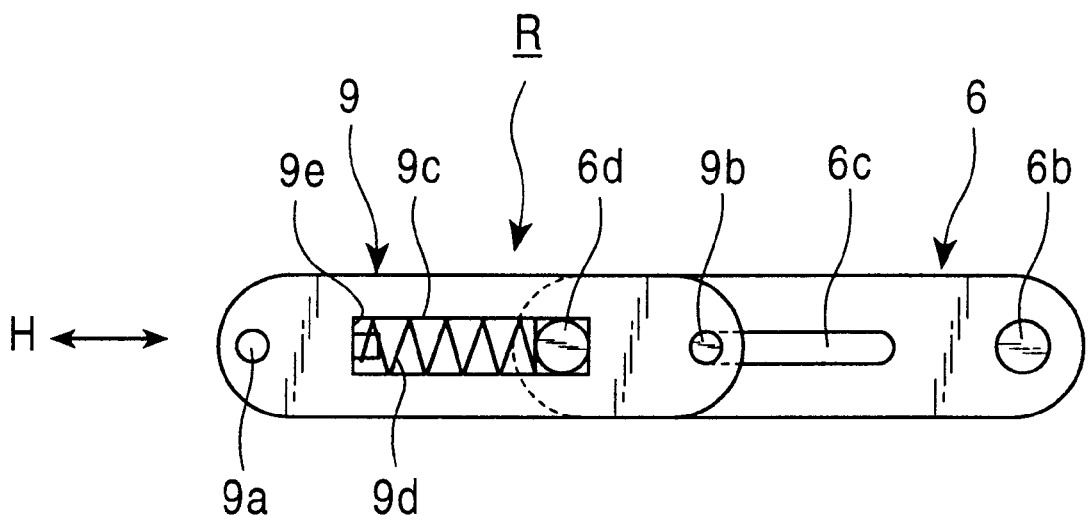
FIG. 8 covers a plan view and a sectional side view of a linking member of the magnetic recording/regenerating apparatus of the invention.
Figure 8B:
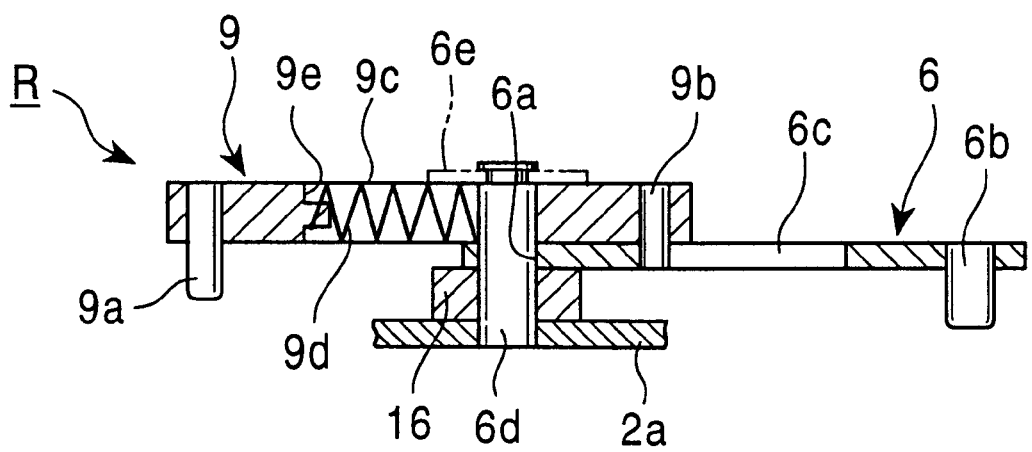

As shown in FIG. 3, the linking member R is engaged with an engagement section 5m of the first sliding member 5. This linking member R is composed of two members: a first linking member 6 and a second linking member 9 as shown in FIGS. 8A and 8B.

The first linking member 6 is formed into substantially a long circular exterior shape, and has a round hole 6a formed through a portion toward the left end in FIG. 3. A round-pin-shaped junction 6b is secured by pressing or the like to the first linking member 6 toward the right end in FIG. 3. A narrow groove 6 is formed through in the longitudinal direction between the round hole 6a and the junction 6b.

A second linking member 9 having substantially a long circular exterior shape is arranged on the upper surface of the first linking member 6 to the left in the drawing. A round-pin-shaped junction 16a is secured by pressing or the like to the second linking member 9 toward the left end in the drawing. A guide pin 9b is secured by pressing or the like toward the right end in the drawing, and a laterally long rectangular hole 9c is formed through between the junction 9a and the guide pin 9b in the longitudinal direction.

The aforementioned linking member R is rotatably supported by the fulcrum 6d comprising a support pin, attached to the bottom plate 2a of the enclosure.

A washer 16 is inserted at the fulcrum 6d the round hole 6a of the first linking member 6 is inserted over the washer 16; the rectangular hole 9c of the second linking member 9 is inserted on the first linking member 6; a stopper washer 6e represented by a two-point chain line is inserted onto the leading end of the fulcrum 6d; and the first linking member 6 and the second linking member 9 are prevented from coming off the fulcrum 6d.

Because the guide pin 9b of the second linking member 9 is inserted into the narrow groove 6c of the first linking member 6, the first and the second linking members 6 and 9 are slidable in the longitudinal direction. The rotating directions are unified, and the first and the second linking members 6 and 9 are rotatable clockwise or anticlockwise around the fulcrum 6d.

The elastic member 9d comprising a coil spring or the like is inserted, while prevented from coming off, into the rectangular hole 9c of the second linking member 9. An end of the elastic member 9d comes into contact the fulcrum 6d, and the other end is in contact with an end face 9e of the rectangular hole 9c.

As a result, the first and the second linking members 6 and 9 forming the linking member R are imparted with an elastic force in the longitudinal arrow H direction under the effect of the elastic member 9d and are thus expandable.

The junction 6b of the first linking member 6 of the linking member R engages with the engagement section 5m of the first sliding member 5. The linking member 6 and the first sliding member 5 are thus connected. When the second sliding member S described later is caused to slide, the linking member R rotates, and the junction 6b moves in the engagement section 5m of the first sliding member 5, thus permitting sliding of the first sliding member 5 in the arrow F or G direction shown in FIG. 3.

The junction 9a of the second linking member 9 of the linking member R is detachably engaged with the second sliding member S as shown in FIG. 3.

The second sliding member S is slidably supported on the bottom plate 2a of the enclosure 2, and comprises two members arranged on top of the other including an upper first member 7 and a lower second member 8. The first and the second members 7 and 8 are stamping-formed by press fabrication of metal sheets or the like, respectively.

Figure 9:
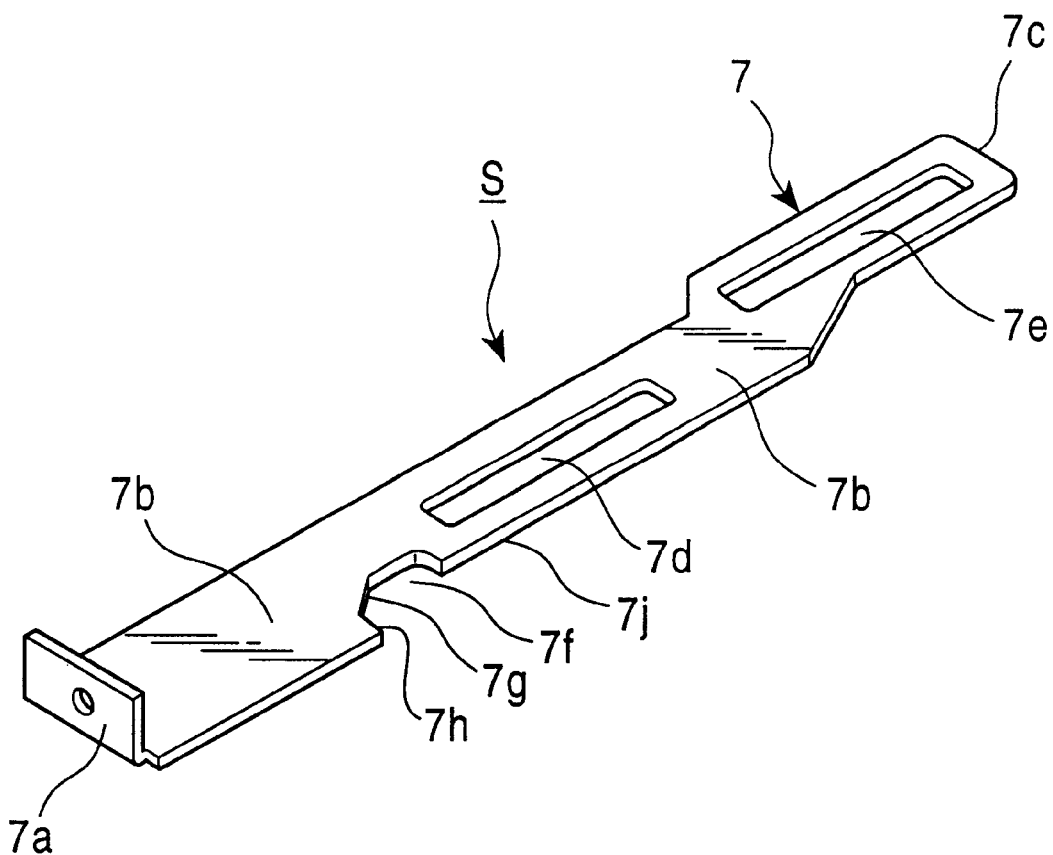
FIG. 9 is a perspective view of a first member of the second sliding member of the magnetic recording/regenerating apparatus of the invention.

In the first member 7, as shown in the perspective view of FIG. 9, the pressing section 7a on the front side in the drawing is folded upward, and a flat portion 7b is formed on the back.

Two attachment holes 7d and 7e spaced apart from each other by a prescribed distance are stamping-formed in longitudinally long shapes toward the rear end 7c in the longitudinal direction of the flat portion 7b.

Relative to the attachment hole 7e near the rear end 7c, the front side attachment hole 7d is formed with a slight right-side shift.

A notched engagement section 7f is provided on a right side surface 7j of the attachment hole 7d toward the pressing section 7a. An inclined portion 7g and a stopper 7h flat in a direction perpendicular to the sliding direction of the first member 7 are formed on the engagement section 7f. In this configuration, the junction 9a of the second linking member 9 is engaged with the engagement section 7f.

Figure 10:
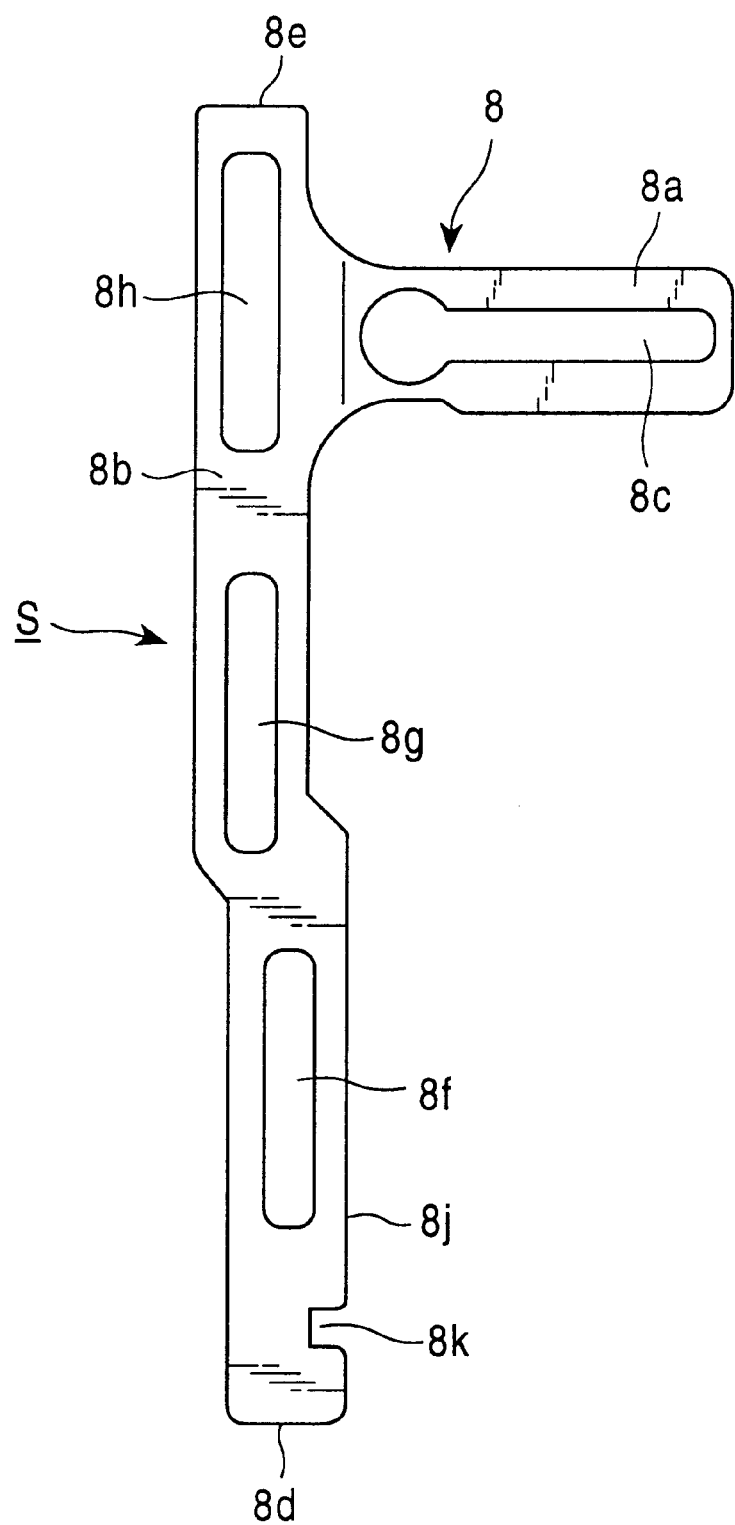
FIG. 10 is a plan view of a second member of the second sliding member of the magnetic recording/regenerating apparatus of the invention.

The second member 8 arranged under the first member 7 comprises a metal sheet or the like, has a base 8a laterally extending as shown in FIG. 10 and a longitudinally long and flat support 8h perpendicular to the base 8a, and presents substantially a T-shaped exterior form.

A laterally long cam groove 8c is stamping-formed having one substantially rectangular side and the other circular side on the base 8a.

A leading end 8d is formed in the lower part of the support 8b and a rear end 8e is formed in the upper part thereof. Three longitudinally long rectangular attachment holes 8f, 8g and 8h are stamping-formed in the longitudinal direction of the support 8b. A concave engagement section 8k is notched in a side surface 8j on the right side between the front-side attachment hole 8f and the leading end 8d.

The junction 9a of the second linking member 9 to be engaged with the engagement section 7f of the first member 7 is engaged with the engagement section 8k. The junction 9a of the linking member R is detachably engaged with the engagement sections 7f and 8k between the first member 7 and the second member 8 of the second sliding member S.

The first member 7 and the second member 8 as described above are made slidable by inserting three fixing pins 8p second to the bottom plate 2a of the enclosure 2 into the three attachment holes 8f, 8g and 8h as shown in FIG. 3. The first member 7 is slidably attached onto the second member 8 by inserting fixing pins 8p and 8p inserted into the two attachment holes 8f and 8g near the leading end 8d into the attachment holes 7d and 7e.

The junction 9a of the second linking member 9 is brought into pressure contact with, and is engaged with the respective engagement sections 7f and 8k of the first and the second members 7 and 8 with the second sliding member S.

When the second member 8 is caused to slide, the first member 7 slides in the same direction as the second member 8, and the second linking member 9 in engagement with the respective engagement sections 7f and 8k rotates while expanding or contracting.

A cam member 10 comprising a metal plate or the like and having gear formed on the outer periphery thereof is arranged on the lower surface of the base 8a of the second member 8 as shown in FIG. 3, and this cam member 10 is rotatably supported by the bottom surface 2a of the enclosure 2. A driving pin 10a is attached by caulking to a position spaced apart from the rotational center of the cam member 10.

A two-stage gear 11 comprising pinion gear 11a engaging with the gear on the outer periphery of the cam member 10 and a large-diameter plain gear 11b is arranged to the right of the cam member 10. The two-stage gear 11 is rotatably supported by the bottom plate 2a of the enclosure 2.

Above the two-stage gear 11, there is provided a two-stage pinion 12 engaging with the plain gear 11b of the two-stage gear 11. The two-stage pinion 12 is rotatably supported by the bottom plate 2a of the enclosure 2. In the two-stage pinion 12, pinion gears having different diameters are integrally formed in the upper and the lower parts thereof. In the upper part, a small pinion gear 12a engaging with the plain gear 11b of the two-stage gear 11 is formed, and in the lower part, a large pinion gear 12b having an exterior shape larger than the small pinion gear 12a is formed.

A driving source 13 comprising a motor or the like is attached to a motor attachment hole 2j above the cam member 10. A worm gear 13a is attached under a pressure to a rotation shaft of the driving source 13, and this worm gear 13a engages with the large pinion 12b of the two-stage pinion 12.

Figure 11:
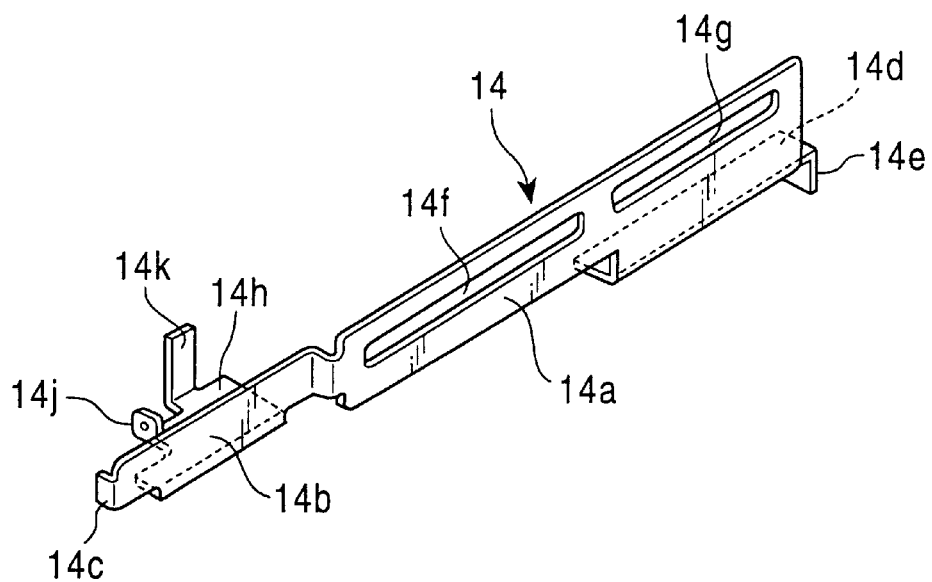
FIG. 11 is a perspective view of an operating member of the magnetic recording/regenerating apparatus of the invention.

A longitudinally long operating member 14 as shown in FIG. 11 is slidably attached to the side plate 2b to the right of the enclosure 2 shown in FIG. 3. The operating member 14 comprises a metal plate or the like and has an attachment section 14a for slidably attaching to the side plate 2b to the right, and an arm 14b folded in a stair shape to the left from the attachment section 14a. The front side end of the arm 14b is folded to the left to form a leading end 14c.

The lower side of the attachment section 14a is folded to the left to form a flat operating section 14d, and a rear end 14e linked with the operating section 14d is formed by folding downward.

Two attachment holes 14f and 14g are formed linearly by stamping in the longitudinal direction of the attachment section 14a toward the upper end of the attachment section 14a.

A bottom plate 14h is formed by folding the lower side of the arm 14b to the left. The front end of this bottom plate 14h is folded upward to form a spring stopper 14j. A round hole is formed in this spring stopper 14j.

On the left side opposite to the arm 14b, there is formed a contact section 14k comprising the left end of the bottom plate 14h folded upward.

When mounting the cartridge 4 onto the first sliding member 5, the contact section 4k is pressed at the right end on the front side 4f of the cartridge 4, and the operating member 14 also moves while sliding into the apparatus 1 together with the cartridge 4.

A coil spring 15 is stretched between the respective round holes of the spring stopper 14j of the operating member 14 and the opening/closing section 5f of the first sliding member 5. Upon ejecting operation for removing the cartridge 4 loaded in the apparatus 1, the first sliding member 5 slides in the arrow G direction. The operating member 14 is pulled by the coil spring 15 so that the operating member 14 also slides in the arrow G direction toward the cartridge insertion port 1a.

A transfer roller 18 rotatable by a driving source not shown other than the aforesaid driving source 13 is provided to the left of the head attachment hole 2e of the bottom plate 2a of the enclosure 2 shown in FIG. 3. A friction member such as rubber is attached to the outer periphery of the transfer roller 18 so as to prevent the pinch roller 4h from slipping when the pinch roller 4h of the cartridge 4 rotates as a result of pressure contact.

A magnetic head 18 attached to a member not shown is arranged toward the two stoppers 2f of the head attachment hole 2e.

A longitudinally long ejection button 19 slidably attached on the front side of the side plate 2b to the left of the enclosure 2.

Operations of the apparatus 1 of the invention having the configuration as described above will now be described. In the interior of the apparatus 1 prior to inserting the cartridge 4, the first sliding member 5 is positioned on the cartridge insertion port 1a, and the stoppers 5j and 5j comprising a pair of stopper rollers are located at the respective windows 2c and 2c of the enclosure.

The loading operation of the cartridge 4 represented by a two-point chain line into the apparatus 1 in this state first comprises a step of inserting the cartridge 4 in the arrow F direction through the cartridge insertion port 1a.

The right and left guides 4a and 4b of the cartridge 4 are guided by guiding rails (not shown) provided on the right and left side plates 2b and 2b of the enclosure 2 near the cartridge insertion port 1a, and the cartridge 4 comes into the enclosure 2.

Figure 12:
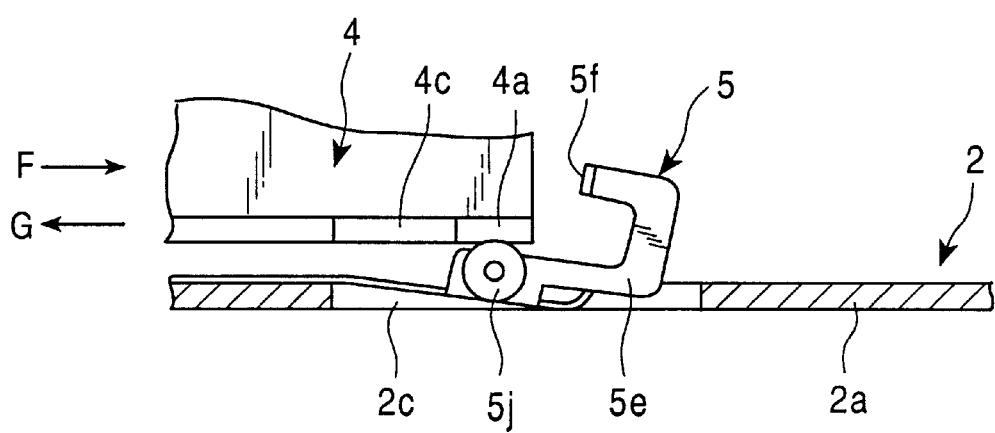
FIG. 12 is a partial sectional side view illustrating operations of the magnetic recording/regenerating apparatus of the invention.

Then, as shown in FIG. 12, the leading end of the guide 4a of the cartridge 4 presses down the stopper 5j of the first sliding member 5 into the window 2c of the enclosure 2.

When the cartridge 4 is further pushed into the apparatus from this state, and end 4, of the cover 4k of the cartridge 4 comes into contact with the opening/closing section 5f of the first sliding member 5, and the cover 4k is opened toward the front of the cartridge 4.

Figure 13:
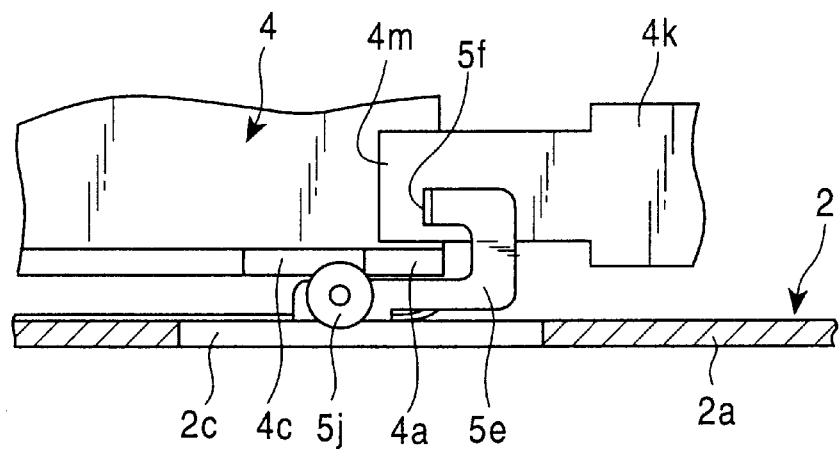
FIG. 13 is a partial sectional side view illustrating operations of the magnetic recording/regenerating apparatus of the invention.

Simultaneously with opening operation of the cover 4k, or after opening the cover 4k, the stopper 5j having been pressed down into the window 2c of the enclosure 2 is located at the engagement section 4c at the position of the window 2c as shown in FIG. 13 by pushing further the cartridge 4 into the apparatus 1. The stopper 5j elastically restores its original horizontal condition, and stops the engagement section 4c of the cartridge 4.

Elastic restoration of the stopper 5j into the horizontal condition creates a click feeling of the cartridge 4, thus allowing the operator to recognize that the stopper 5j of the first sliding member 5 has stopped the cartridge 4 and the cartridge 4 has been mounted on the first sliding member 5.

Inertia from insertion of the cartridge 4 into the apparatus 1 pushes the cartridge 4 further into the apparatus 1. However, the left end of the front side 4f of the cartridge 4 coming in contact with the stopper 5h of the first sliding member 5 prevents the cartridge 4 from being inserted further into the apparatus 1.

As a result of operation of mounting the cartridge 4 onto the first sliding member 5 brings the right end of the front side 4f of the cartridge 4 into contact with the contact section 14k, thus causing the operating member 14 to move inward in the apparatus 1.

Then, an operating section 14d of the operating member 14 starts a detecting member (not shown) comprising a switch or the like to turn on the same. Upon turn-on of this detecting member, driving of the driving source 13 comprising a motor or the like is started.

Driving of the driving source 13 is transferred to the two-stage gear 11 and the cam member 10 via the two-stage pinion gear 12 shown in FIG. 3 to cause the cam member 10 to rotate.

Figure 15:
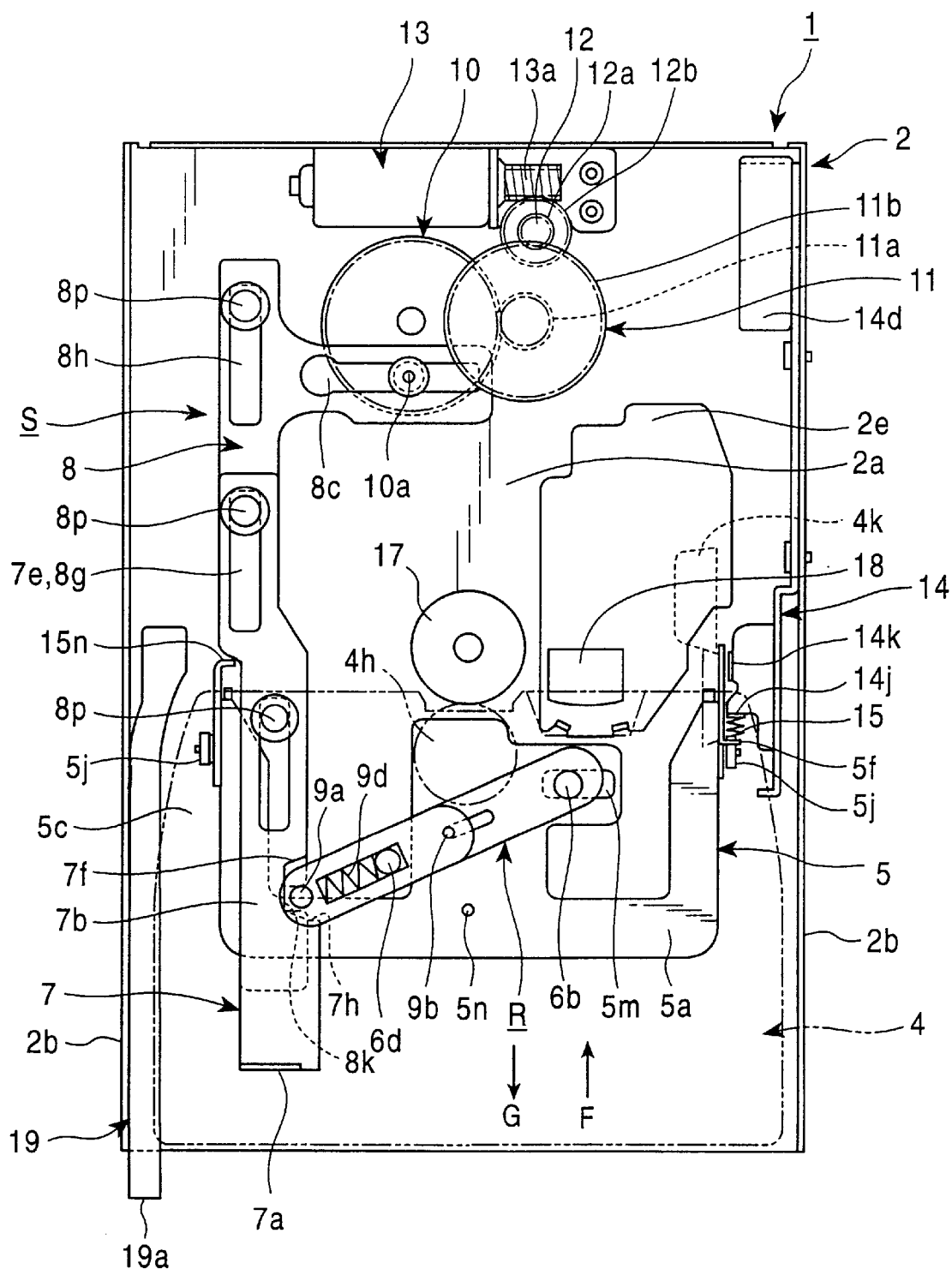
FIG. 15 is a schematic plan view illustrating operations of the magnetic recording/regenerating apparatus of the invention.

Along with rotation of the cam member 10, a driving pin 10a located in the upper part moves through the cam groove 8c of the second member 8 of the second sliding member S to a position in the lower part as shown in FIG. 15, and this driving pin 10a causes the second member 8 to slide in the arrow G direction.

Then, the first member 7 also slides in the arrow G direction, the same direction as that of the second member 8. The second linking member 9 having the junction 9a having been in engagement with the respective engagement sections 7f and 8k, respectively, expands or contracts under the action of the elastic member 9, and the linking member R having so far been left-up as shown in FIG. 3 rotates anticlockwise to become left-down as shown in FIG. 15.

As a result of this anticlockwise rotation of the linking member R, the first sliding member 5 having the cartridge 4 loaded thereon slides in the arrow F direction, counter to the sliding direction of the second sliding member S.

Figure 14:
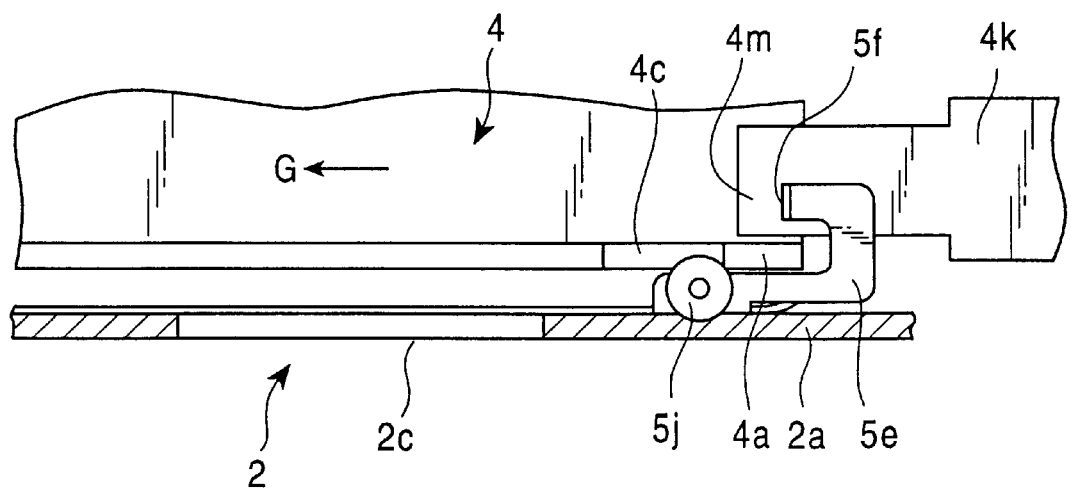
FIG. 14 is a partial sectional side view illustrating operations of the magnetic recording/regenerating apparatus of the invention.

The stopper 5j located at the window 2c of the bottom plate 2a moves by sliding onto the bottom plate 2a of the enclosure 2 as shown in FIG. 14. Downward movement of the stopper 5j is thus regulated, thus permitting maintenance of stoppage of the engagement section 4c of the cartridge 4 with the stopper 5j.

As a result, even if it is tried to take out the cartridge 4 from the apparatus 1, the stopper 5j cannot escape downward, thus preventing removal of the cartridge from the apparatus 1.

When the cartridge 4 is stopped by the stopper 5j, and further the driving source 13 is driven, the linking member 6 is rotated further anticlockwise by sliding of the second sliding member S in the arrow G direction, and the pinch roller 4h of the cartridge 4 is brought into pressure contact with the transfer roller 17. When the pinch roller 4h is brought into pressure-contact with the transfer roller 17, the cartridge 4 is loaded onto the apparatus 1. The loading operation is thus completed, and driving of the driving source 13 is discontinued.

Then, the magnetic tape 4d is brought into sliding contact with the tape sliding contact surface of the magnetic head 18, and sliding of the first sliding member 5 and the second sliding is discontinued.

Upon completion of the loading operation of the cartridge and stoppage of driving of the driving source 13, the transfer roller 17 is rotated by rotating a driving source not shown other than the driving source 13 in response to an instruction from an external computer (not shown) or the like, to cause the pinch roller 4h to rotate.

The magnetic tape 4d is transferred by rotating the reel 4e via a tape feed belt 4p in linking with rotation of the pinch roller, thereby permitting recording and regeneration onto and from the magnetic tape by the magnetic head 18.

The ejecting operation for taking out the cartridge from the apparatus 1 comprises a step of pressing the leading end 19a of an eject button 19 projecting from the apparatus 1: the other end of the eject button 19 in the interior of the apparatus 1 turns on a switch not shown.

The driving source 13 is stated: cam member 10 rotates, and the driving pin 10a moves upward as shown in FIG. 3. The second sliding member S moves in the arrow F direction. Then, the linking member 6 rotates clockwise around the fulcrum 6d. The first sliding member 5 connected to the junction 6e of the first sliding member 5 moves in the arrow G direction, and the first sliding member 5 slides to the cartridge insertion port 1a side.

Then, in a state in which the stopper 5j of the first sliding member 5 having been positioned on the bottom plate 2a shown in FIG. 14 stops the cartridge 4, the rear end of the cartridge 4 represented by a two-point chain line in FIG. 3, located at the window 2c of the bottom plate 2a of the enclosure 2 shown in FIG. 13 is discharged outside the apparatus 1, and the ejecting operation of the cartridge 4 is completed.

When the cartridge 4 is removed in this state, the stopper 5j is pressed by the guide section 4 of the cartridge 4 into the window 2c below and escapes downward, thereby permitting easy removal of the cartridge 4 from the apparatus 1.

Figure 16:
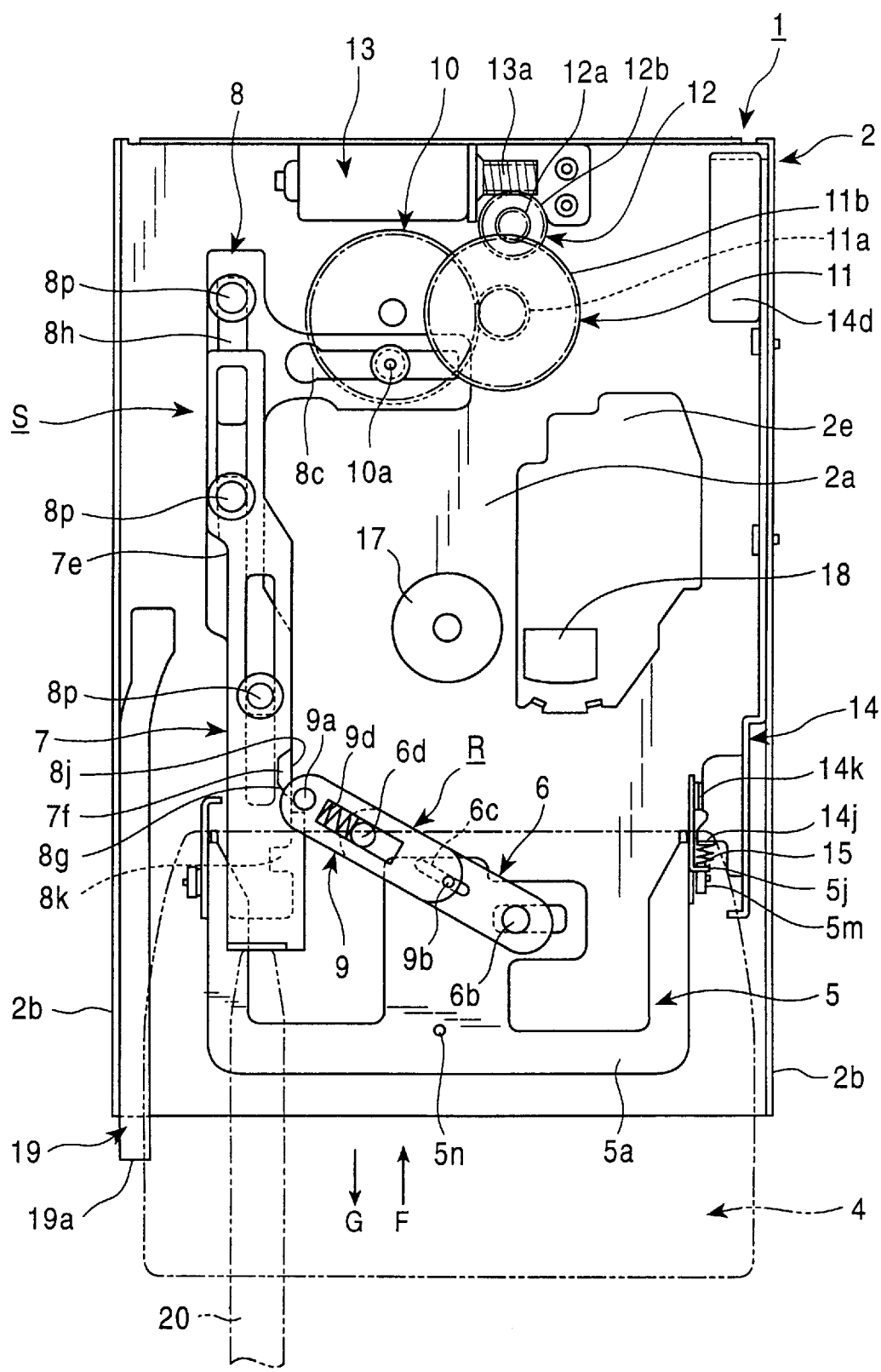
FIG. 16 is a schematic view illustrating operations of the linking member of the magnetic recording/regenerating apparatus of the invention.

When the driving source 13 fails because of some problem after completion of the loading operation for loading the cartridge 4, or during loading or unloading operation of the cartridge 4, in the apparatus 1 of the invention, a pressing member 20 comprising a screw driver or the like is inserted from the cartridge insertion port 1a side on the front of the apparatus 1 as shown in FIG. 16, and the pressing section 7a of the first member 7 is pressed. As a result, the inclination portion 7h of the first member 7 presses the junction 9a of the second linking member 9, and the linking member R expands or contracts under the action of the elastic member 6d.

As a result of expansion and contraction of the linking member R, engagement of the junction 9a of the second linking member 9 having been in engagement with the engagement section 7f of the first member 7 and the engagement section 8k of the second member 8 is released. The junction 9a is pushed by the flat stopper 7h of the first member 7, and is brought into pressure contact with the side surface 8j of the second member 8.

When the first member is further pushed in the arrow F direction, the linking member R expands or contracts, rotates clockwise, and the inclination shown in FIG. 15 is reversed from left-down to left-up.

The reversing operation of the linking member R causes the first sliding member 5 to slide in the arrow G direction, thus permitting discharge of the cartridge 4.

Even when it is impossible to electrically remove the cartridge 4 as a result of stoppage of the driving source after loading of the cartridge 4 or in the middle of loading or unloading operation of the cartridge 4 as a result of a power failure or the like, therefore, it is possible to easily discharge manually the cartridge 4.

Another embodiment of the present invention will now be described, only as to difference from the aforementioned embodiment, with reference to FIGS. 17 and 18.

First, the second sliding member S' comprises a first member 37 and a second member 38, and the first member 37 and the second member 38 are detachably engaged with each other. The detachable engagement is accomplished by detachably engaging an engagement pin 37a of the first member 37 with a concave engagement section 38a formed on a side 38j of the second member 38. An elastic member 39 is stretched between the first member 37 and the second member 38 so as to keep them in a state in which the first and the second members 37 and 38 pull each other.

The second sliding member S' has a configuration in which the first member 37 is rotatable around a support pin 38b serving as a fulcrum relative to the second member 38 so as to form a pressing section 37b on the front of the first member 37 at a prescribed inclination angle to the sliding direction of the first member 37.

Junctions 36a and 36n are provided at one end and the other end, respectively, of the linking member 36. The junction 36a of that one end is engaged with an engagement section 5m of the first sliding member 5, and the junction 36b of the other end is engaged with an engagement section 37c of the first member 37 of the second sliding member S'.

When the inclined pressing section 37b on the front of the first member 37 is pressed with the pressing member 40, the first member 37 rotates around a support pin 38b along the inclined front 37b of the pressing section 37b, and the engagement pin 37a of the first member 37 comes off the engagement section 38a of the second member 38, positioning the same on the side 38j under the action of the elastic member 39.

Engagement between the first member 37 and the second member 38 is released, and the first member 37 slides in the arrow F direction.

Figure 17:
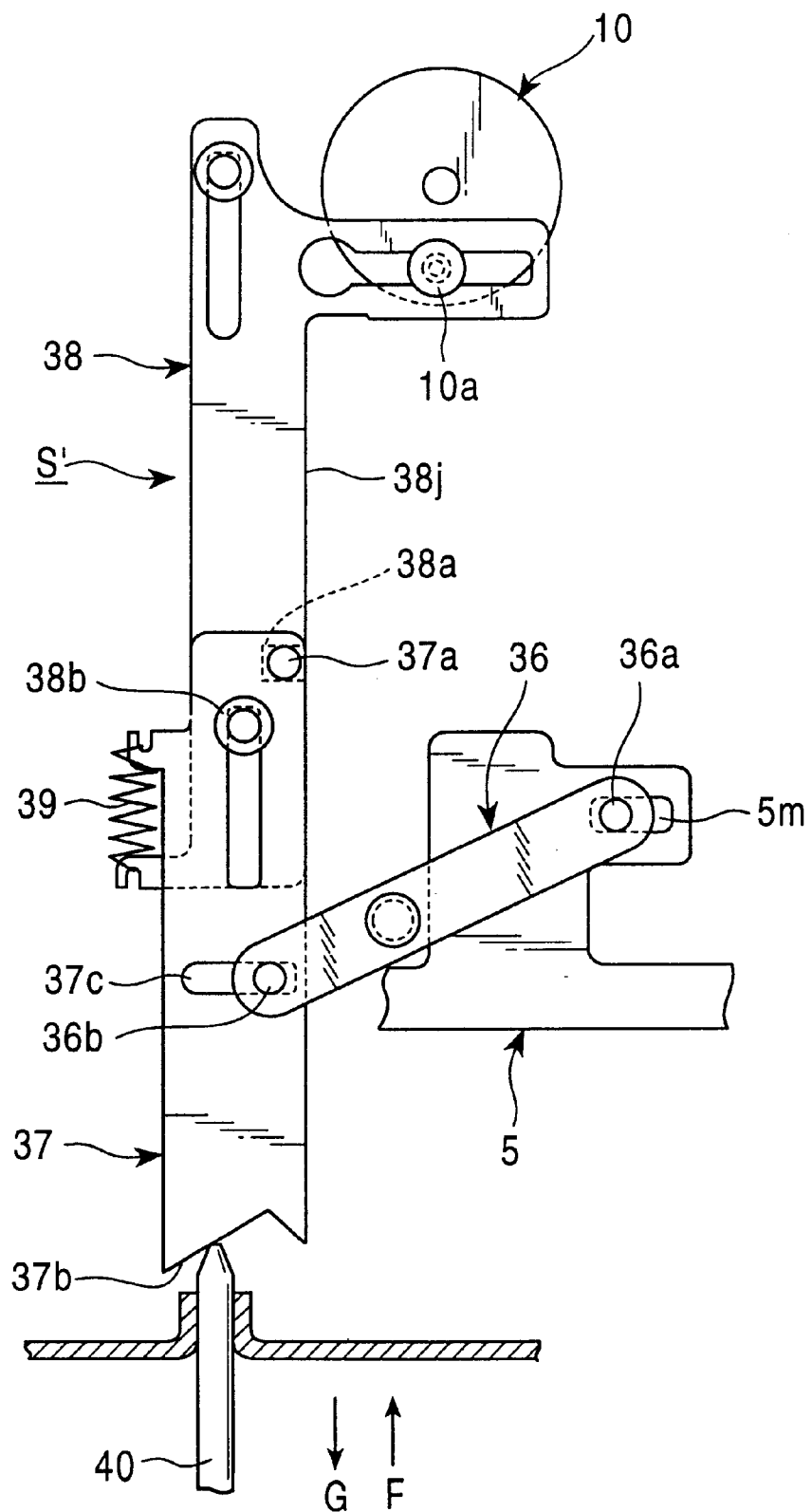
FIG. 17 is a schematic view illustrating another embodiment of the magnetic recording/regenerating apparatus of the invention.
Figure 18:
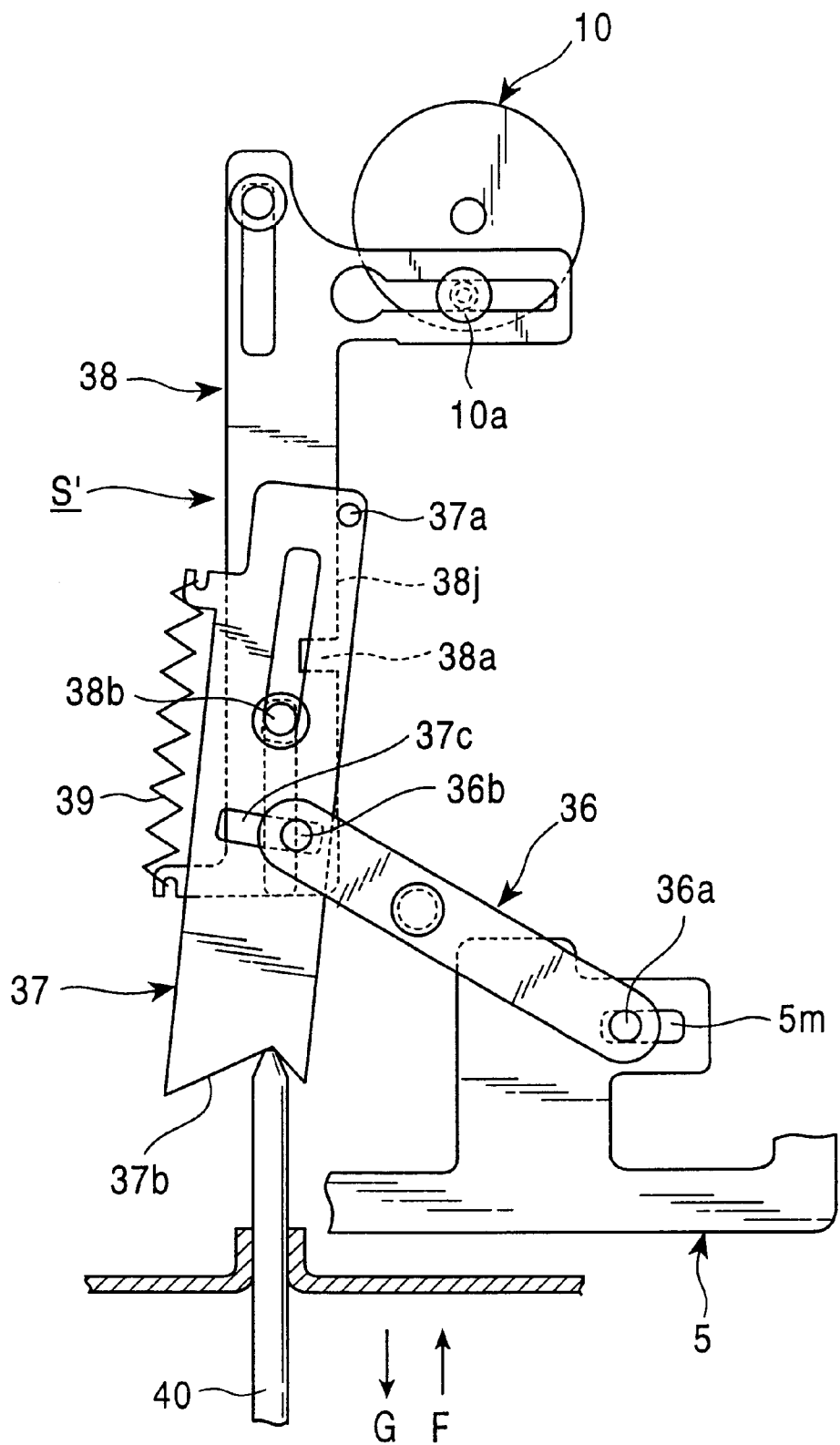
FIG. 18 is a schematic view illustrating operations in still another embodiment of the magnetic recording/regenerating apparatus of the invention.
Figure 19:
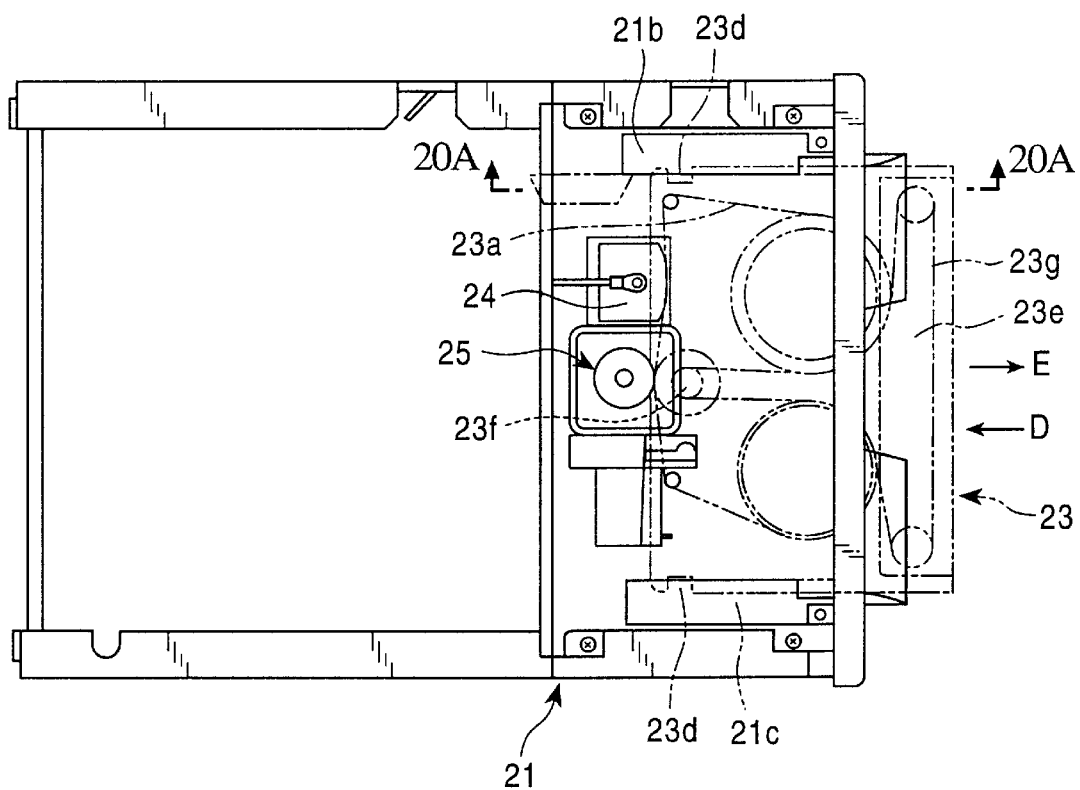
FIG. 19 is a schematic plan view of the conventional magnetic recording/regenerating apparatus.
Figure 20A:
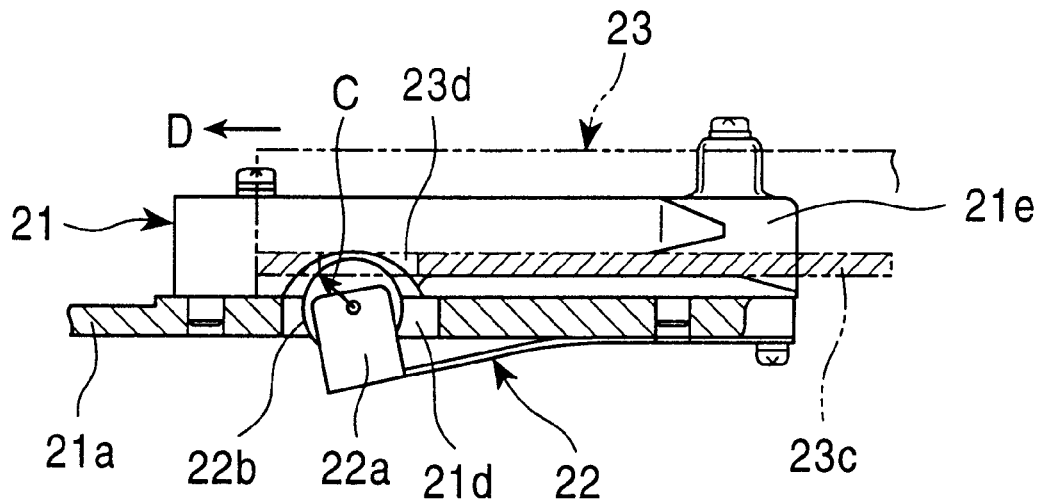
FIG. 20 covers a partial sectional view and a partial side view of the conventional magnetic recording/regenerating apparatus.
Figure 20B:
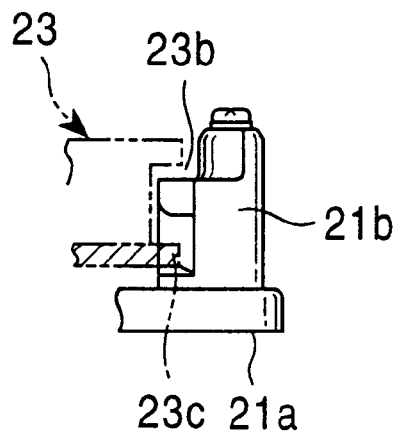

In linkage with sliding of the first member 37 in the arrow F direction, the linking member 36 rotates clockwise, and left-down shown in FIG. 17 is reversed in to left-up shown in FIG. 18. Reversal of the linking member 36 causes the first sliding member 5 to slide in the arrow G direction, thus permitting discharge of the cartridge 4.

In the above description of the other embodiment, the second sliding member S' has been described as one formed by providing the engagement pin 37a on the first member 37 and providing an engagement section 38a on the second member 38. An engagement section (not shown) may be formed on the left side of the first member 37, and an engagement pin (not shown) may be provided on the second member 38 side corresponding to the above engagement section.

In the magnetic recording/regenerating apparatus of the present invention, the portion between an end and the other end of the linking member is rotatably supported by the enclosure; a pressing section is provided on a part of the first member; the linking member is reversed with the supporting point as a fulcrum when the first member is caused to slide by pressing the pressing section of the first member to cause the first sliding member to slide via the linking member for discharging the cartridge. Therefore, even when a power failure makes it impossible to drive the driving source, and to conduct auto-ejection for electrically discharging the cartridge, it is possible to ensure discharge and removal of the cartridge with a small force by rotating the linking member by pressing the pressing section of the first member with the use of a pressing member such as a screw driver.

In the magnetic recording/regenerating apparatus of the invention, the linking member comprises a first and a second linking members; the first and the second linking members are expandably combined by imparting an elastic force in the longitudinal direction; a junction is formed for each of the first and the second linking members; the junction of the first linking member is engaged with an engagement section of the first sliding member; the junction of the second linking member is detachably engaged with an engagement section between the first member and the second member; when pressing the pressing section of the first member, the portion between the first and the second linking members expands or contracts; engagement of the junction of the second linking member in engagement with the engagement section between the first member and the second member is disengaged; and the linking member is reversed in linkage with sliding of the first member, thereby discharging the cartridge. Therefore, even when the driving source cannot be driven as a result of a power failure or the like, it is possible to release engagement between the first and the second members without any resistance by causing expansion or contraction of the linking member by pressing the first member with a small force, and easily remove the cartridge by manual ejection.

In the magnetic recording/regenerating apparatus of the invention, the second sliding member has a configuration in which the first member and the second member are detachably engaged with each other at the engagement section so as to make the first member rotatable relative to the second member; the pressing section of the front portion of the first member is formed with a prescribed inclination angle to the sliding direction of the first member; a junction is provided at each of one end and the other end of the linking member; the junction at that one end is engaged with the engagement section of the first sliding member; the junction at the other end is engaged with the engagement section of the second sliding member; when pressing the inclined pressing section of the first member, the first member rotates along the inclination of the pressing section, and the first member and the second member are disengaged from each other; the first member slides; and in linkage with sliding of the first member, the linking member is reversed, thereby discharging the cartridge. Therefore, engagement between the first member and the second member can be released with no resistance and the cartridge can easily be taken out by rotating the first member by pressing the first member with a small force.

What is claimed is:

1. A magnetic recording/regenerating apparatus comprising an enclosure for loading therein and discharging therefrom a cartridge containing therein a magnetic tape, a first sliding member slidably provided in said enclosure in the inserting direction and in the discharging direction of said cartridge with said cartridge loaded in said enclosure, a second sliding member slidably provided in said enclosure in the inserting direction and in the discharging direction of said cartridge and causing the first sliding member to slide in the inserting direction and in the discharging direction, said second sliding member comprising a first member and a second member connected to a driving source, said first member and said second member being connectable and disconnectably provided so as to move in one body, said first member being provided with a pressing section, and a linking member connecting said first sliding member and said second sliding member, wherein the portion between an end and the other end of the linking member connected to said first sliding member and to said second sliding member, respectively, is rotatably supported by said enclosure; the pressing section of the first member of said second sliding member is pressed to cause said first member to slide with said first sliding member moved in the loading direction of said cartridge, whereby said first member and said second member of said second sliding member are disconnected; and said linking member is rotated with the supporting point of said linking member as a fulcrum to cause said first sliding member to slide in the discharging direction of said cartridge via said linking member for discharging said cartridge.

2. A magnetic recording/regenerating apparatus according to claim 1, wherein said linking member comprises a first linking member and a second linking member; said first and said second linking members being connected via an elastic member so as to be expandable in the longitudinal direction; a junction is formed for each of said first and said second linking members; the junction of said first linking member is engaged with an engagement section of said first sliding member; the junction of said second linking member is detachably engaged with an engagement section between said first member and the second member; when pressing the pressing section of said first member, the portion between said first and said second linking members expands or contracts; engagement of the junction of said second linking member in engagement with the engagement section between said first member and said second member is disengaged; and said linking member is rotated in linkage with sliding of the first member, thereby discharging said cartridge.

3. A magnetic recording/regenerating apparatus according to claim 1, wherein said second sliding member has a configuration in which said first member and said second member are detachably engaged with each other at an engagement section so as to make said first member rotatable relative to said second member; said pressing section of the front portion of said first member is formed with a prescribed inclination angle to the sliding direction of said first member; a junction is provided at each of one end and the other end of said linking member; the junction at said one end is engaged with the engagement section of said first sliding member; the junction at said other end is engaged with the engagement section of said second sliding member; when pressing said inclined pressing section of said first member, said first member rotates along the inclination of said pressing section, and said first member and said second member are disengaged from each other; said first member slides; and in linkage with sliding of the first member, said linking member is rotated, thereby discharging said cartridge.

* * * * *

UNITED STATES PATENT AND TRADEMARK OFFICE
CERTIFICATE OF CORRECTION

PATENT NO.    : 6,233,113 B1
DATED         : May 15, 2001
INVENTOR(S)   : Masao Ohkita et al.

It is certified that error appears in the above-identified patent and that said Letters Patent is hereby corrected as shown below:

Claim 1,
Line 13, change "connectable" to -- connectably --.

Signed and Sealed this

Eighth Day of January, 2002

Attest:

JAMES E. ROGAN
Attesting Officer    Director of the United States Patent and Trademark Office